United States Patent [19]

Takagi et al.

[11] Patent Number: 4,801,973

[45] Date of Patent: Jan. 31, 1989

[54] PHOTOGRAPHIC PAPER RESERVER MECHANISM

[75] Inventors: Kunio Takagi, Tokyo; Takashi Matsumoto, Saitama, both of Japan

[73] Assignee: Fuji Photo Film Co., Ltd., Kanagawa, Japan

[21] Appl. No.: 151,676

[22] Filed: Feb. 2, 1988

[30] Foreign Application Priority Data

Feb. 17, 1987 [JP] Japan ............................ 62-21962[U]

[51] Int. Cl.[4] ........................ G03B 27/32; G03B 27/52

[52] U.S. Cl. ........................................ 355/27

[58] Field of Search .............................. 355/27, 28, 29

[56] References Cited

U.S. PATENT DOCUMENTS 4,639,118 1/1987 Kogane et al. ........................ 355/29

4,697,918 10/1987 Kogane ................................ 355/27

4,723,153 2/1988 Kogane ................................ 355/29

*Primary Examiner*—Monroe H. Hayes

*Attorney, Agent, or Firm*—Sughrue, Mion, Zinn, Macpeak & Seas

[57] ABSTRACT

A photographic paper reserver mechanism disposed between a printing unit and a development unit and adapted for absorbing the difference between the processing speeds of the printing unit and the development unit. This photographic paper reserver mechanism is provided with a flap which is movable between a first position at which the flap guides the leading end of the photographic paper supplied from the first roller so that this leading end is received by the second roller and a second position at which the flap allows the photographic paper received by said second roller to be bent and suspended between the first and second rollers, and at least one guide arm which forms, between itself and the flap, a path through which the photographic paper is transported to the second roller when the flap is in the first position, and which is interposed between the first and second rollers so as to prevent the photographic paper from moving straight to the second roller when the flap is in the second position. The photographic paper can be guided from the first roller to the second roller while being positively curved and suspended.

20 Claims, 4 Drawing Sheets

PHOTOGRAPHIC PAPER RESERVER MECHANISM

BACKGROUND OF THE INVENTION

1. Field of the Invention

This invention relates to a photographic paper reserver mechanism disposed between a printing unit and a development unit in a photographic paper reserver and adapted for guiding photographic paper.

2. Related Art

A type of photography printing and developing apparatus is known in which a printing unit for printing photographic paper with an image of a film and a development unit for developing the photographic paper that has been printed with the image are connected to each other.

This type of photography printing and developing device is provided with a photographic paper reserver for absorbing the difference between the processing speeds of these units, that is, the difference between the speed at which photographic paper is transported through one of these units and the speed at which the paper is transported through the other unit. This photographic paper reserver is provided with a first guide roller positioned at the side of the printing unit and a second guide roller positioned at the side of the development unit. An intermediate portion of the photographic paper is curved and suspended between these rollers. The difference between the photographic-paper transportation speeds of the printing and development units is thereby absorbed, enabling the photographic paper to be supplied smoothly.

However, it would be possible that an intermediate portion of the photographic paper supplied from the first guide roller is not smoothly curved and suspended in a desired direction so that it is folded doubly or triply when it is pinched by or wound around the second guide roller.

To cope with this problem, a type of reserver has been proposed which has an auxiliary roller which is disposed in the vicinity of the second guide roller and which rotates in the opposite direction relative to the second guide roller. In this photographic-paper reserver provided with the auxiliary roller, there is such a merit that, even though an intermediate portion of the photographic paper is not smoothly curved and suspended in the desired manner, it is prevented from being folded doubly or triply.

However, the photographic-paper reserver of the construction using the auxiliary roller necessitates an additional driving device for driving the auxiliary roller, thereby making the reserver structure totally complicated. Moreover, there would be a possibility of damage of the photographic paper due to the rotation of the auxiliary roller in the opposite direction.

SUMMARY OF THE INVENTION

The present invention has been achieved in consideration of these facts, and an object of the present invention is to provide a photographic paper reserver mechanism of a simple construction capable of guiding the photographic paper while smoothly curving and suspending the paper, enabling the printing and development processing to be performed smoothly.

To this end, the present invention provides a photographic paper reserver mechanism for absorbing the difference between the photographic-paper processing speeds of a printing unit and a development unit, comprising: a first roller means supplied with photographic paper processed by the printing unit; a second roller means for receiving the photographic paper supplied from the first roller means and guiding the photographic paper to the development unit; a flap movable between a first position at which the flap guides the leading end of the photographic paper supplied from the first roller means to the second roller and a second position at which the flap retreats from the first position so as to enable the photographic paper received by the second roller means to be bent and suspended between the first and second roller means; and at least one guide arm forming, between itself and the flap, a path through which the photographic paper is transported to the second roller means when the flap is in the first position, and the guide arm being interposed between the first and second roller means so as to prevent the photographic paper from moving straight from the first roller means to the second roller means when the flap is in the second position.

In the photographic paper reserver mechanism of this construction, the flap is moved to a position at which it is stretched between the first and second guide roller means when the leading end of the photographic paper is introduced from the printing unit to the development unit. At this time, the guide arm forms between itself and the flap a path through which the photographic paper is supplied from the first guide roller means to the second guide roller means.

After the leading end of the photographic paper has been introduced to the second guide roller means, the flap moves and retreats from the second guide roller means so that a space is formed below the first and second guide roller means. In this space, an intermediate portion of the photographic paper that is intermittently supplied from the printing unit at a comparatively high speed is curved and suspended and is then guided to the second guide roller means. At the same time, the guide arm is interposed between the first and second guide roller means so as to prevent the intermediate portion of the photographic paper from being directly introduced from the first guide roller means to the second guide roller means without being suspended in a suitable manner. Therefore, the intermediate portion of the photographic paper can be positively curved and suspended before it is guided and transported to the second guide roller means and the development unit.

Thus, the present invention ensures, with a simple construction, that the printing process and the development process can be performed smoothly by curving and suspending intermediate portions of the photographic paper in a suitable manner without folding them doubly or triply.

DESCRIPTION OF THE PREFERRED EMBODIMENT

Figure 1:
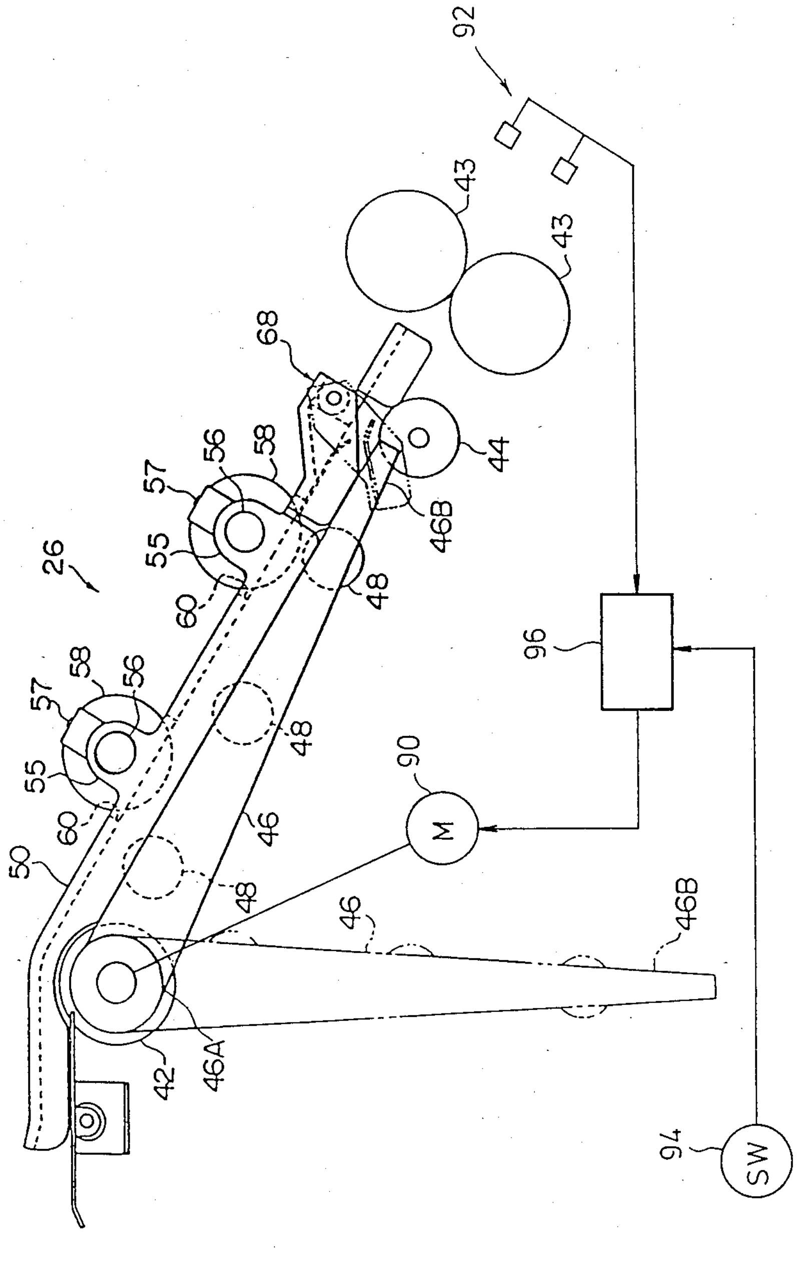
FIG. 1 is a cross-sectional view of an photographic paper reserver to which a photographic paper reserver mechanism in accordance with the present invention is applied.
Figure 2:
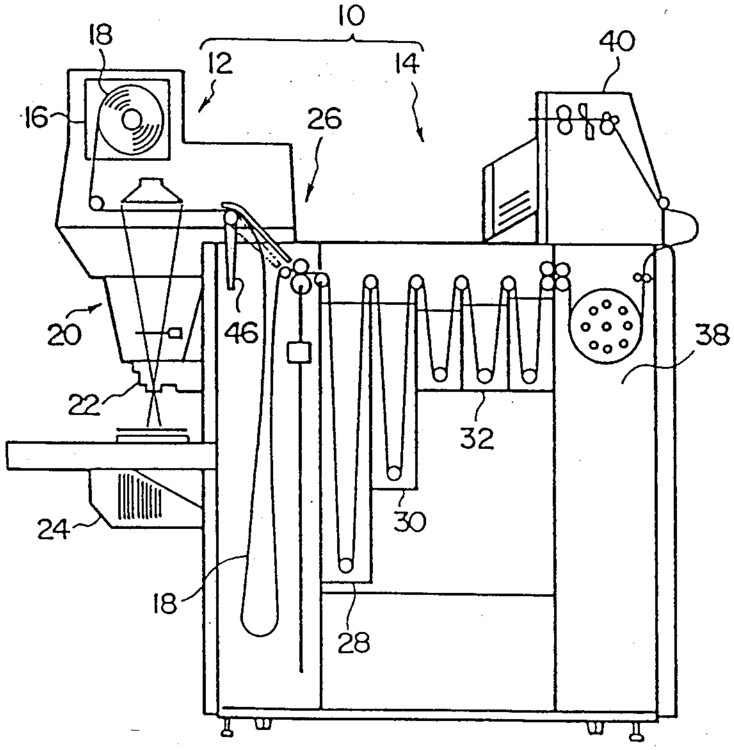
FIG. 2 is cross-sectional view of the entire construction of a photography printing and developing apparatus to which the photographic paper reserver mechanism of the present invention is applied.

FIG. 1 shows in section a photographic paper reserver mechanism in accordance with the present invention, and FIG. 2 shows in section the entire construction of a photography printing and developing apparatus 10 to which the photographic paper reserver mechanism in accordance with the present invention is applied.

Referring to FIG. 2, the photography printing and developing apparatus 10 is constituted by a printing unit 12 and a development unit 14. A paper magazine 16 which accommodates a roll of photographic paper 18 is disposed in the printing unit 12. The photographic paper 18 which has been drawn out of the paper magazine 16 is successively guided and transported to a printing section 20. In the printing section 20 are disposed an optical system 22 and a light source 24 for printing images of a negative film onto the photographic paper 18. In this case, the printing paper 18 is transported in such a manner that it is alternately stopped and moved in accordance with printing operation performed every frame of the images. After printing, the photographic paper 18 is supplied to a photographic-paper reserver 26 and is, after passing through the photographic-paper reserver 26, supplied to the development unit 14.

The development unit 14 is provided with a development vessel 28, a bleaching and fixing vessel 30, and a washing vessel 32. These vessels are processing baths containing processing liquids and used to develop the photographic paper 18 after exposure.

A drying chamber 38 is disposed at the side of the washing vessel 32. After development, the photographic paper 18 is dried in the drying chamber 38, and is taken out after passing through a cutter unit 40. Since the photographic paper 18 is continuously developed in the development unit 14, the speed at which the photographic paper 18 is transported therethrough is constant.

The intermittent transportation of the photographic paper 18 through the printing unit 12 is absorbed by the photographic paper reserver 26, thereby enabling the photographic paper 18 to be continuously transported to the development unit 14.

As shown in FIG. 1, the photographic paper reserver 26 is provided with a first guide roller 42 disposed at the side of the printing unit 12, a pair of driving rollers 43 disposed at the side of the development unit 14, and a second guide roller 44 disposed in the vicinity of the driving rollers 43 between the driving rollers 43 and the first guide roller 42. The first guide roller 42 and the driving rollers 43 are rotated when driven by a driving device (not shown).

A base end 46A of a flap 46 is supported at the axial direction opposite ends of the first guide roller 42 coaxially therewith. The flap 46 is a guide plate adapted for guiding the photographic paper 18 from the first guide roller 42 to the second guide roller 44. The flap 46 is pivotally movable about the base end 46A between a first position at which it is stretched between the first and second guide rollers 42 and 44 (as indicated by the solid line in FIG. 1) and a second position at which its top end 46B is distanced from the second guide roller 42 (as indicated by the double-dashed chain line in FIG. 1). The flap 46 is stretched between the first and second guide rollers 42 and 44 in the initial state in which the leading end of the photographic paper 18 is supplied from the printing unit 12 and starts to enter this section. After the leading end of the photographic paper 18 has completely passed over the second guide roller 44, the flap 46 rotates about the base end 46A so that the top end 46B moves downward away from the second guide roller 44. In this distanced state, a space in which the photographic paper can be curved and suspended is formed between the first and second guide rollers 42 and 44.

The flap 46 has free rollers 48 disposed in three rows arranged in the direction in which the photographic paper 18 is transported. Each free roller 48 is axially supported on the flap 46 in such a manner that it is freely rotatable and a part of the roller 48 protrudes beyond the upper surface of the flap 46. While the flap 46 is being stretched between the first and second guide rollers 42 and 44 after it has rotated to this position, the roller 48 contacts the lower surface of the photographic paper 18 that is moving thereover, thereby smoothly guiding the paper. A guide cover 50 is disposed above the first guide roller 42 and the flap 46 in such a manner that it faces the first guide roller 42 and the flap 46. A gap which is formed between the guide cover 50 and the flap 46 when the flap 46 is stretched between the first guide roller 42 and the second guide roller 44 serves as a path for the photographic paper 18.

The guide cover 50 is constituted by a central plate 51 and side plates 53 disposed on the opposite sides of the central plate 51. Shaft-support projections 54 and 55 are formed on the upper surfaces of the central plate 51 and the side plates 53 so that their center axes are aligned with each other. Support shafts 56 are supported by the shaft-support projections 54 and 55 so that they extend in the direction perpendicular to that in which the photographic paper 18 is transported. Engagement screws 57 which are screwed into the shaft-support projections 55 press the support shafts 56 so as to fix the support shafts 56 to the shaft-support projections 55. Therefore, if the engagement between the projections 55 and the support shafts 56 is released by loosening the engagement screws 57, the side plates 53 can slide in the widthwise direction of the cover 50 (the axial direction of the support shaft 56) so as to change the entire width of the guide cover 50 in accordance with the width of the photographic paper 18.

A curl-prevention roller 58 is rotatably supported on each support shaft 56 at an intermediate portion thereof. A rectangular through hole 60 is formed in the central plate 51 in a position corresponding to each curl-prevention roller 58, a lower portion of the curl-prevention roller 58 is fitted into the through hole 60, the lower end of this portion slightly protruding downward beyond the lower surface of the central plate 51. Therefore, when the photographic paper 18 enters the path formed between the flap 46 and the guide cover 50, it is pinched between the free rollers 48 attached to the flap 46 and the curl-prevention rollers 58 attached to the guide cover 50 so that it can be transported in a flattened state without any curling.

In this case, the dimensions of parts of this section may be determined so as to enable the photographic paper 18 to be curled in the opposite direction so that the widthwise central portion of the photographic paper is slightly projected downward relative to both side portions.

Figure 3:
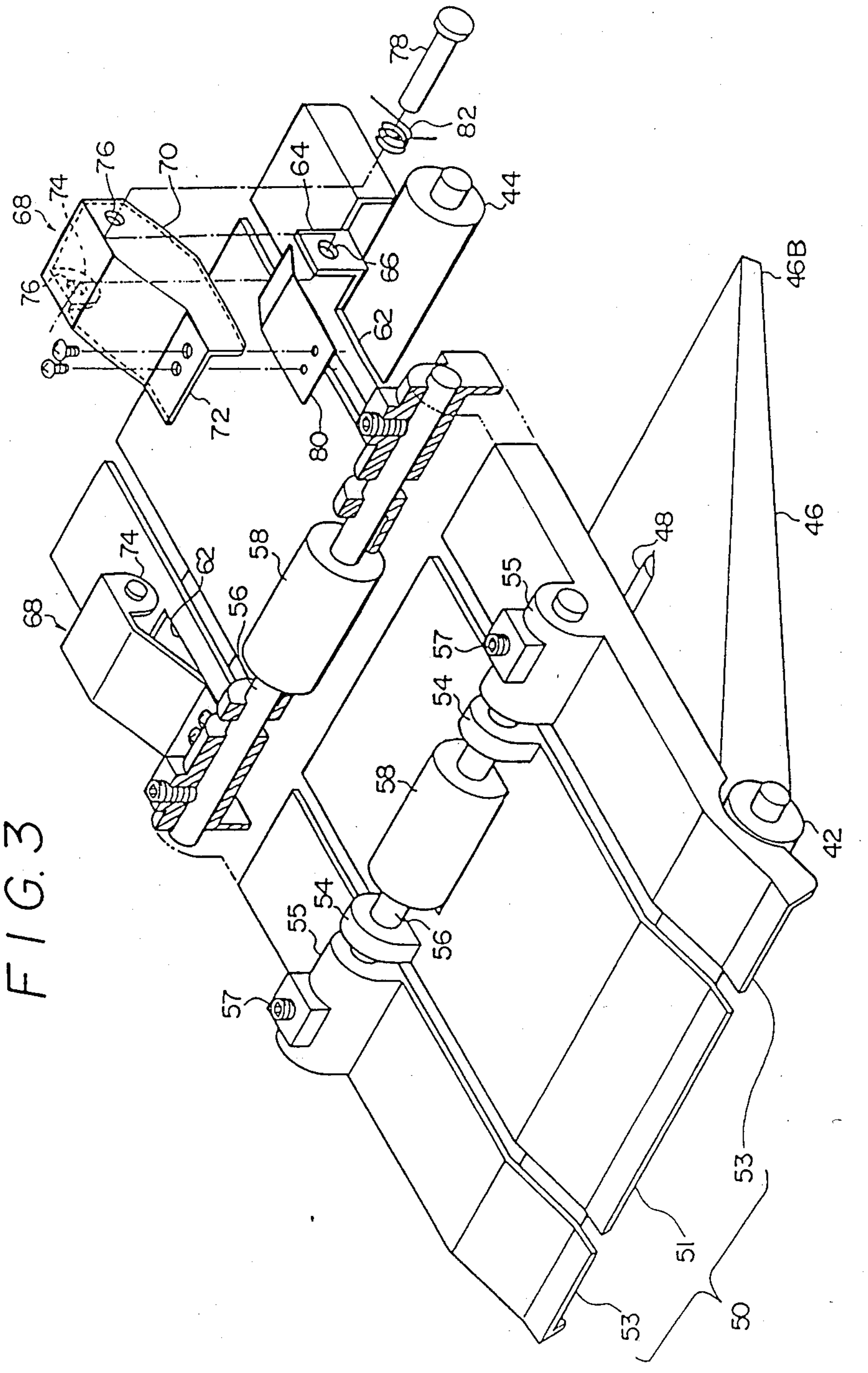
FIG. 3 is a perspective view of the photographic paper reserver shown in FIG. 1.

Referring now to FIG. 3, cut-out portions 62 are formed in the side plates 53 in the vicinity of the far ends of the second guide roller 44. A cut-and-raised projection 64 is formed at the rear end of each cut-out portion 62 (at the side of the second guide roller 44) so that it projects upward from the side plate 53. Each projection 64 has a through hole 66. A guide arm 68 is disposed in each cut-out portion 62.

Each guide arm 68 has a base plate portion 70 and an upper plate portion 72 which projects perpendicularly from the base plate portion 70 so that it has an L-shaped cross-section. A lug 74 extends parallel to the base plate portion 70 from a rear end portion of the upper plate portion 72. A through hole 76 is formed in the lug 74 at the center thereof, and another through hole 76 is formed in the base plate portion 70 that faces the lug 74. These though holes are coaxial with each other. Each guide arm 68 is rotatably supported in the cut-out portion 62 by a pin 78 which passes through the through holes 76 and the through hole 66 formed in the projection 64.

One end of a guide piece 80 is fixed to an inner front-end portion of the base plate portion 70 of each guide arm 68. The guide piece 80 is bent at its intermediate portion. The other end of the guide piece 80 extends to an inner central position of the guide arm 68 so that it can contact and guide the moving photographic paper 18. A torsion spring 82 is axially supported by the pin 78 between the guide arm 68 and the side plate 53, thereby constantly urging the guide arm 68 in the direction in which the guide arm 68 projects downward through the cut-out portion 62. That is, when the flap 46 rotates to the position at which it is stretched between the first and second guide rollers 42 and 44, the top end 46B of the flap 46 is brought into contact with lower surfaces of the base plate portions 70 of the guide arms 68 so as to upwardly move the guide arms 68 against the urging force of the torsion coil springs 82. When the flap 46 rotates in the opposite direction so that the top end 46B is moved apart from the second guide roller 44, the guide arms 68 are moved downward by the urging force of the torsion coil springs 82.

In this case, when the guide arms 68 are in the upper positions, the path through which the photographic paper 18 passes is formed between the flap 46 and the guide pieces 80 of the guide arms 68. When the guide arms 68 are in the lower positions, the guide arms 68 are interposed between the first and second guide rollers 42 and 44 so that they cover the outer periphery of the second guide roller 44 over a quarter of the outer periphery thereof, thereby preventing the photographic paper 18 from moving straight form the first guide roller 42 over the second guide roller 44. Therefore, when the guide arm 68 are in the lower positions, the photographic paper 18 is suspended from the first guide roller 42 while bending at a large curvature and is thereafter wound around the second guide roller 44.

As shown in FIG. 1, a mechanism for driving the flap 46 includes a motor 90 which makes the flap 46 rotate and move between the first and second positions, a sensor 92 having light emitting and receiving elements and adapted for detecting the leading end of the photographic paper, a main switch 94 for starting the photography printing and developing apparatus 10, and a controller for controlling the motor 90 on the basis of signals supplied form the sensor 92 and the main switch 94.

Next, the operation in accordance with this embodiment will be described below. When the main switch 94 of the photography printing and developing apparatus 10 is turned on, the flap 46 is moved from the second position to the first position by the rotation of the motor 90 in the normal direction. The photographic paper 18 is printed with an image in the printing section 20 of the printing unit 12, and is thereafter led, by its leading end, to the development unit 14 through the photographic paper reserver 26.

The photographic paper 18 is transported from the printing unit 12 to the reserver 26 in an intermittent manner each time it is printed with an image. In the photographic paper reserver 26, the photographic paper 18 is transported by being introduced into the gap between the first guide roller 42 and the guide cover 50. In this state, as described above, the flap 46 is being stretched between the first and second guide rollers 42 and 44 after it has rotated about the base end 46A, and the guide arms 68 are in the upper positions after they have been rotated upward against the urging force of the torsion coil springs 82 by the flap 46 that contacts the lower ends of the base plate portions 70 of the guide arms 68.

The leading end of the photographic paper 18 which has passed over the first guide roller 42 is transported while being pinched between the free rollers 48 on the flap 46 and the curl-prevention rollers 58 on the guide cover 50. Even if a leading end portion of the photographic paper 18 tends to curve in the widthwise direction and have a lengthwise gutter-like shape, it is prevented from being deformed by the curl-prevention roller 58 when brought into contact with this roller, so that it restores the flatness before it is guided to the top end 46B of the flap 46.

Since the path through which the photographic paper 18 is transported is formed between the top end 46B and the guide pieces 80, the leading end of the photographic paper 18 is guided by the end 468 and is introduced via the second guide roller 44 into the nip between the driving rollers 43 which are driven previously. Therefore, the photographic paper 18 is free from a kind of deformation or bending which might be caused when it contacts the peripheral surface of the driving roller 43 at its widthwise intermediate portion if it is curved and have a gutter-like section.

When the leading end of the photographic paper 18 passes over the second guide roller 44 and is pinched completely by the driving rollers 43, in other words, when it is detected by the sensor 92, the operation of driving the driving rollers 43 is temporarily stopped, and the rotation of the motor 90 is reversed so that the flap 46 rotates about the base end 46A and moves downward and the top end 46B is moved away from the second guide roller 44. At the same time, the guide arms 68, which have been pushed upward by the flap 46 in contact with the base plate portions 70, is moved downward by the urging force of the torsion coil springs 82.

After the printing operation has further proceeded so that an intermediate portion of the photographic paper 18 is introduced into the reserver via the first guide roller 42, the upper surface of the photographic paper 18 is pressed so that it is depressed downward as the guide arms 68 rotates and moves downward. Simultaneously, the guide piece 80 forms a guide path through which the suspended photographic paper 18 can be guided in front of the second guide roller relative to the direction of transportation, thereby enabling the intermediate portion of the photographic paper 18 to be wound around the second guide roller 44.

After the flap 46 has been moved away from the second guide roller 44 to the vertically suspended position, the guide arms 68 are interposed between the first and second guide rollers 42 and 44, and a space is formed therebelow. Therefore, the intermediate portion of the photographic paper 18 that has passed over the first guide roller 42 is bent downward by its weight while being wound around the second guide roller 44, so that it is suspended from the first and second guide rollers 42 and 44. Since any curling of the photographic paper 18 has been eliminated by the curl-prevention rollers 58, the photographic paper 18 is smoothly bent and suspended. If there is a certain degree of curling, an unnecessary bending force is locally exerted on the photographic paper 18 when the photographic paper 18 is bent downward and suspended, so that the photographic paper 18 may be damaged.

If, when the photographic paper 18 is introduced in the reserver via the first guide roller 42, the intermediate portion of the photographic paper 18 is not suitably curved and suspended due to its stiffness so that it tends to be folded doubly when transported over the second guide roller 44, it is obstructed by the guide arms 68 so that it can be positively curved and suspended. The photographic paper advances while maintaining the suspended form, and is introduced in front of the second guide roller 44 relative to the transporting direction via the bending guide path formed by the guide pieces 80 of the guide arms. Therefore, there is no possibility of the photographic paper 18 being folded doubly or triply, and the photographic paper 18 can be smoothly and positively guided to the second guide roller 44 in conformity with the shape of the guide pieces 80.

After the length of the suspended portion has reached a predetermined value, the operation of driving the driving rollers 43 is started, and the photographic paper 18 successively and continuously undergoes the development process. As the photographic paper 18 is supplied to the development unit 14 after it has been bent and suspended by the photographic paper reserver 26, the difference between the transportation speeds of the printing unit 12 and the development unit 14 is absorbed. Therefore, the photographic paper 18 can be introduced into the development unit 14 at a constant speed, thereby enabling processing steps in the development unit 14 to be conducted smoothly.

Figure 4:
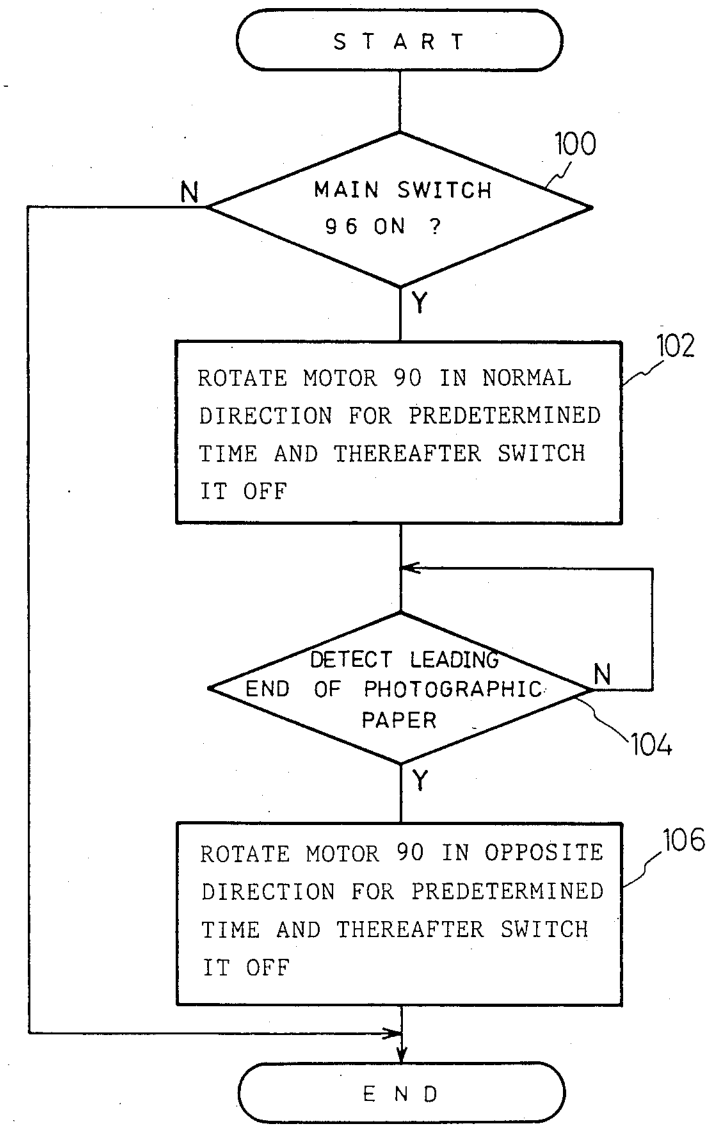
FIG. 4 is a flow chart of the operation of the controller.

FIG. 4 is a flow chart of the operation of the controller 96.

If, in Step 100, the main switch 94 is turned on, the motor 90 rotates in the normal direction for a predetermined period of time and is thereafter switched off in Step 102, thereby rotating and moving the flap 43 from the second position to the first position. After printing, the photographic paper 18 is led by its leading end to the reserver 25 while the flap 43 is in the first position, and is pinched and driven by the driving rollers 43 in the reserver so that it is transported to the development unit 14. At this time, in Step 104, the leading end of the photographic paper 18 is detected by the sensor 92, and, in Step 106, the motor 90 rotates in the opposite direction for a predetermined time and is switched off so that the flap 46 is moved from the first position to the second position. The processing exerted on the photographic paper 18 proceeds while the flap 46 is in the second position. That is, the flap 46 is not rotated until the main switch is turned on in order to start the next processing.

What is claimed is:

1. A photographic paper reserver mechanism for absorbing the difference between the photographic paper processing speeds of a printing unit and a development unit, comprising:

first roller means supplied with photographic paper processed by said printing unit;

second roller means for receiving said photographic paper supplied from said first roller means and guiding said photographic paper to said development unit;

a flap movable between a first position at which said flap guides the leading end of said photographic paper supplied from said first roller means to said second roller means and a second position at which said flap retreats from said first position so as to enable said photographic paper received by said second roller means to be bent and suspended between said first and second roller means; and at least one guide arm forming, between itself and said flap, a path through which said photographic paper is transported to said second roller means when said flap is in said first position, and said guide arm being interposed between said first and second roller means for preventing said photographic paper from moving straight from said first roller means to said second roller means when said flap is in said second position.

2. A photographic paper reserver mechanism, according to claim 1, wherein the number of said at least one guide arm is two, said pair of guide arms being arranged in the widthwise direction of said guided photographic paper, and wherein the distance between said pair of guide arms can be changed in accordance with the width of said photographic paper.

3. A photographic paper reserver mechanism, according to claim 2, further comprising guide cover means disposed generally parallel to said flap in said first position, for forming a generally straight transportation path extending from said first roller means to said second roller means, wherein said guide arms are supported on said guide cover means.

4. A photographic paper reserver mechanism, according to claim 3, wherein said guide cover means is constituted by three guide plates disposed in three rows extending along said transportation path, and wherein said pair of guide arms are disposed in the vicinity of said second roller means and respectively supported on an opposite pair of plates in said three guide plates.

5. A photographic paper reserver mechanism, according to claim 4, wherein said opposite pair of guide plates in said three guide plates can be closed to or distanced from the remaining central guide plate.

6. A photographic paper reserver mechanism, according to claim 5, further comprising urging means for urging said guide arms toward said photographic paper transportation path.

7. A photographic paper reserver mechanism, according to claim 6, further comprising third roller means provided in said central guide plate, for pressing said photographic paper toward said flap when said photographic paper is transported between said guide cover means and said flap in said first position.

8. A photographic paper reserver mechanism, according to claim 7, further comprising at least one free roller provided in said flap, said free roller being in contact with said photographic paper when said photographic paper is transported over said flap in said first position, thereby smoothly guiding said photographic paper.

9. A photographic paper reserver mechanism, according to claim 8, wherein said flap rotates about the axis of said first roller means so as to move to said first or second positions.

10. A photographic paper reserver mechanism, according to claim 9, further comprising driving means for rotating said flap between said first and second positions.

11. A photographic paper reserver, mechanism for use in a photography printing and developing apparatus having a printing unit for printing photographic paper with an image and a development unit for developing said photographic paper printed with said image, said photographic paper reserver mechanism being disposed between said printing unit and said development unit for absorbing the difference between the processing speeds of said printing unit and said development unit, said photographic paper reserver mechanism comprising:

a first roller disposed in the vicinity of said printing unit and supplied with photographic paper processed by said printing unit;

a second roller disposed in the vicinity of said development unit and adapted for receiving said photographic paper supplied from said first roller and guiding said photographic paper to said development unit;

a flap movable between a first position at which said flap guides the leading end of said photographic paper supplied from said first roller so that said photographic paper moves generally straight to said second roller and a second position at which said flap retreats from said first position so as to enable said photographic paper received by said second roller to be bent by the weight of said photographic paper and suspended between said first and second rollers; and at least one guide arm forming, between itself and said flap, a photographic paper transportation path when said flap is in said first position, and said guide arm being interposed between said first and second rollers for preventing said photographic paper from moving straight from said first roller to said second roller when said flap retreats to said second position.

12. A photographic paper reserver mechanism, according to claim 11, wherein the number of said at least one guide arm is two, said pair of guide arms being arranged in the widthwise direction of said guided photographic paper, and wherein the distance between said pair of guide arms can be changed in accordance with the width of said photographic paper.

13. A photographic paper reserver mechanism, according to claim 12, further comprising a guide cover disposed generally parallel to said flap in said first position, for forming a generally straight path through which said photographic paper is transported.

14. A photographic paper reserver mechanism, according to claim 13, wherein said guide cover is formed of three plates consisting of a first side plate, a central plate and a second side plate disposed in three rows extending along said photographic-paper transportation path, and wherein said pair of guide arms are disposed in the vicinity of said second roller and are respectively supported on first and second side plates.

15. A photographic paper reserver mechanism, according to claim 14, wherein said first and second side plates can be closed to or distanced from said central plate.

16. A photographic paper reserver mechanism, according to claim 15, further comprising at least one spring for urging said guide arms toward said photographic paper transportation path.

17. A photographic paper reserver mechanism, according to claim 16, further comprising at least one curl-prevention roller provided in said central guide plate for pressing said photographic paper toward said flap when said photographic paper is transported between said guide cover and said flap in said first position.

18. A photographic paper reserver mechanism, according to claim 17, further comprising at least one free roller provided in said flap, said free roller being in contact with said photographic paper when said photographic paper is transported over said flap in said first position, thereby smoothly guiding said photographic paper.

19. A photographic paper reserver mechanism, according to claim 18, further comprising moving means for moving said flap to said first position or said second position.

20. A photographic paper reserver mechanism, according to claim 19, wherein said flap is supported coaxially with said first roller, and is rotated by said moving means so as to move to said first position or said second position.

* * * * *